(12) United States Patent
Kosowsky

(10) Patent No.: US 9,939,525 B2
(45) Date of Patent: Apr. 10, 2018

(54) IMAGING SYSTEM FOR OBSCURED ENVIRONMENTS

(71) Applicant: L.H. Kosowsky & Associates, Inc., Stamford, CT (US)

(72) Inventor: Lester H. Kosowsky, Stamford, CT (US)

(73) Assignee: L.H. Kosowsky & Associates, Inc., Stamford, CT (US)

( * ) Notice: Subject to any disclaimer, the term of this patent is extended or adjusted under 35 U.S.C. 154(b) by 613 days.

(21) Appl. No.: 14/503,880

(22) Filed: Oct. 1, 2014

(65) Prior Publication Data

US 2015/0153449 A1 Jun. 4, 2015

Related U.S. Application Data

(60) Provisional application No. 61/910,150, filed on Nov. 29, 2013.

(51) Int. Cl.
| | |
|---|---|
| *G01S 1/00* | (2006.01) |
| *G01S 13/89* | (2006.01) |
| *G01S 13/86* | (2006.01) |
| *G01S 7/04* | (2006.01) |
| *G01S 7/24* | (2006.01) |
| *G01S 13/42* | (2006.01) |

(52) U.S. Cl.
CPC ............ *G01S 13/89* (2013.01); *G01S 13/867* (2013.01); *G01S 7/04* (2013.01); *G01S 7/24* (2013.01); *G01S 13/42* (2013.01)

(58) Field of Classification Search
CPC ........ G01S 13/89; G01S 13/867; G01S 7/024; G01S 7/04; G01S 7/043

USPC ................... 342/385, 25 A, 176, 179, 188
See application file for complete search history.

(56) References Cited

U.S. PATENT DOCUMENTS

| | | | | |
|---|---|---|---|---|
| 5,390,133 A | * | 2/1995 | Sohie | G01S 3/7865 342/159 |
| 5,850,625 A | * | 12/1998 | Maren | G01S 13/86 382/162 |
| 6,288,704 B1 | * | 9/2001 | Flack | G06F 1/1626 345/156 |
| 6,417,797 B1 | * | 7/2002 | Cousins | G06F 15/02 342/175 |
| 7,602,478 B2 | * | 10/2009 | Root, Jr. | F41G 3/04 342/176 |
| 7,626,400 B2 | | 12/2009 | Holbrook et al. | |
| 7,679,546 B2 | | 3/2010 | Bublitz et al. | |
| 7,889,116 B2 | * | 2/2011 | Harada | G01S 13/87 342/59 |
| 8,253,619 B2 | | 8/2012 | Holbrook et al. | |

(Continued)

FOREIGN PATENT DOCUMENTS

WO WO-2013/096704 A1 * 6/2013 ............ G01B 11/00

*Primary Examiner* — Chuong P Nguyen
(74) *Attorney, Agent, or Firm* — Tarolli, Sundheim, Covell & Tummino LLP

(57) ABSTRACT

Systems and methods are provided for imaging a region of interest in an obscured environment. A millimeter band radar assembly is configured to capture a radar image of the region of interest. A data source provides a representation of at least a portion of the region of interest. A data fusion module is configured to combine the radar image and the representation of the region of interest to provide an enhanced representation of the region of interest.

19 Claims, 4 Drawing Sheets

(56) References Cited

U.S. PATENT DOCUMENTS

| | | | |
|---|---|---|---|
| 8,451,162 B2 | 5/2013 | Holbrook et al. | |
| 8,593,157 B2 | 11/2013 | Adams et al. | |
| 8,706,676 B2 * | 4/2014 | Claxton | G06N 7/005 |
| | | | 706/52 |
| 8,884,809 B2 * | 11/2014 | Hyde | G01S 13/86 |
| | | | 340/573.1 |
| 2003/0179084 A1 * | 9/2003 | Skrbina | G01S 13/931 |
| | | | 340/435 |
| 2006/0145919 A1 * | 7/2006 | Pleva | H01Q 1/3283 |
| | | | 342/368 |
| 2008/0170755 A1 * | 7/2008 | Nasser | G06Q 30/02 |
| | | | 382/106 |
| 2008/0272955 A1 * | 11/2008 | Yonak | G01S 13/931 |
| | | | 342/54 |
| 2010/0066586 A1 * | 3/2010 | Liu | G01S 3/74 |
| | | | 342/33 |
| 2010/0225523 A1 * | 9/2010 | Mizutani | G01S 3/48 |
| | | | 342/83 |
| 2014/0043040 A1 | 2/2014 | Adams et al. | |
| 2014/0204215 A1 * | 7/2014 | Kriel | H04N 7/181 |
| | | | 348/159 |
| 2014/0368373 A1 * | 12/2014 | Crain | G01S 5/02 |
| | | | 342/5 |
| 2015/0025788 A1 * | 1/2015 | Crain | G01S 5/02 |
| | | | 701/400 |
| 2016/0003936 A1 * | 1/2016 | Hibino | G01S 13/42 |
| | | | 342/27 |
| 2016/0014395 A1 * | 1/2016 | Murray | G01S 17/89 |
| | | | 348/42 |
| 2016/0210525 A1 * | 7/2016 | Yang | G06K 9/0063 |
| 2017/0038466 A1 * | 2/2017 | Salmen | G01S 17/89 |

* cited by examiner

IMAGING SYSTEM FOR OBSCURED ENVIRONMENTS

RELATED APPLICATIONS

This application claims the benefit of U.S. Provisional Application Ser. No. 61/910,150, which was filed on Nov. 29, 2013.

TECHNICAL FIELD

This invention relates to imaging systems, and more particularly, to an imaging system for obscured environments.

BACKGROUND

Individuals in emergency conditions must deal with a number of adverse conditions when attempting to leave, or assist others in leaving, the affected area. A critical factor in navigating locations in emergency conditions can be a reduced visibility caused by obscurants such as smoke or other airborne particulate matter. In very low visibility conditions, individuals unfamiliar with the environment are reluctant to evacuate through an obscurant sufficiently dense to reduce visibility below ten meters. Individuals familiar with exit routes are able to evacuate through more dense obscurants, at around five meters of visibility. At lower visibility levels, however, the behavior of individuals changes, and more reliance is placed on their feeling their way forward, while crawling along walls, as opposed to relying on visual information. It will be appreciated that this can significantly slow progression through the obscured environment and may result in prolonged exposure to toxic gases.

SUMMARY OF THE INVENTION

In accordance with an aspect of the present invention, a system is provided for imaging a region of interest in an obscured environment. A millimeter band radar assembly is configured to capture a radar image of the region of interest. A data source provides a representation of at least a portion of the region of interest. A data fusion module is configured to combine the radar image and the representation of the region of interest to provide an enhanced representation of the region of interest.

In accordance with another aspect of the present invention, a method is provided for providing a representation of a region of interest in an obscured environment. The region of interest is imaged with a millimeter band radar system to provide a radar image. The radar image and a representation of at least a portion of the region of interest are fused to provide an enhanced representation of the region of interest. The enhanced representation of the region of interest is displayed to a user.

In accordance with an aspect of the present invention, a system is provided or imaging a region of interest in an obscured environment. A millimeter band radar assembly is configured to capture a radar image of the region of interest. A data source provides a representation of at least a portion of the region of interest. A data fusion module is configured to combine the radar image and the representation of the region of interest to provide an enhanced representation of the region of interest. A display configured to display the enhanced image of the region of interest to a user. Each of the millimeter band radar assembly, the data source, the data fusion module, and the display are wearable by the user, such that the user can utilize the enhanced representation to navigate the obscured environment.

DETAILED DESCRIPTION

An imaging system is provided for assisting navigation through obscured environments. The system is intended to combine multiple information sources about an environment of interest to allow individuals, such as occupants of the environment or first responders, to more efficiently navigate the environment. For example, the system can be used to locate boundaries, such as walls and doorways, obstructions, routes that are relatively free of obstruction, and other personnel through the obscurant. Accordingly, the safety of individuals within that environment can be enhanced.

Figure 1:
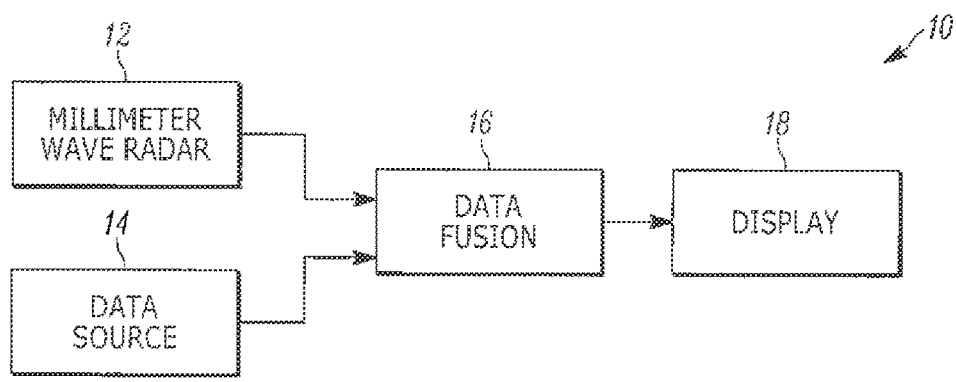
FIG. 1 illustrates an imaging system in accordance with an aspect of the present invention.

FIG. 1 illustrates an imaging system 10 in accordance with an aspect of the present invention. The system 10 includes a millimeter band radar assembly 12 configured to capture a radar image of the region of interest. The millimeter band radar assembly 12 combines the use of short range radar with a radiometer to image through the obscurant and to give the operator the necessary information to define the contents of a given region and its borders. Radar images are provided as a color scale plot showing the amplitude of the radar return in each range x angle bin translated to x-y Cartesian coordinates. From the images, an operator can determine the location of walls, doorways, obstructions, and non-obstructed pathways through the region. The inventor has determined that millimeter band radar, defined broadly herein as radar at frequencies between thirty gigahertz and three hundred gigahertz, has sufficiently little attenuation in obscured environment to allow for successful imaging through an obscurant. In one implementation, the millimeter band radar operates at a frequency between sixty-five gigahertz and ninety-four gigahertz, a frequency band that the inventor has determined to be particularly effective in imaging through smoke and dust. It will be appreciated that both visible and infrared light experience significant attenuation in most common obscurants.

The system 10 depends on the ability of the millimeter band radar 12 to generate effective imaging data, illuminating a given region, such as a room, and any obstacles. The inventor has determined, however, that the relatively low resolution imaging of the millimeter band radar 12 can be enhanced by the addition of another data source 14 that provides a representation of at least a portion of the region of interest. A data fusion module 16 then combines the millimeter band radar image and the representation of the region of interest to provide an enhanced representation of the region of interest, with the enhanced representation provided to an associated display 18. In one implementation, the display 18 can be part of a helmet or faceguard to allow the user to operate the system 10 while engaged in other activities. In this implementation, each of the radar 12, the data source 14, and the data fusion module 16 can also be made wearable by the user to allow the user to easily navigate the obscured environment.

In one implementation, the data source 14 is a thermal imager. The data fusion module 16 can combine the data on a pixel-by-pixel basis to provide a mapping of the region. In another implementation, the data source 14 can be an external source of internal map data for the region. In a mine shaft, the floor/tunnel plans could be loaded previously onto a non-transitory computer readable medium to provide the data source 14. For a fire-fighter application, the building details could be downloaded in real time, for example, using Wi-Fi or 4GE phone networks. In this implementation, the radar data could be displayed in tandem with the stored floor plan to spot obstructions and confirm both the continued accuracy of the floor plan (e.g., due to damage to the walls or floor), as well as the user's position within the region. In one implementation, the data source 14 can further include a global positioning system (GPS) device or other navigation system to assist in tracking the user within the known floor plan.

In another implementation, the other data source 14 can include transmitters or reflectors placed along an exit path or other important locations within the region of interest. The transmitters or reflectors can produce or reflect radiation that can be received by a receiver or imager associated with the system. In one implementation, reflectors that are responsive to the microwave radiation emitted from the millimeter wave radar assembly 12 can be utilized to provide an enhanced signal-to-noise ratio at the radar receiver. For example, an emergency personnel could carry with him radar-coded "exit indicators", which would respond to illumination of microwave signals. These reflectors can be placed along the path of the emergency personnel's route into the region of interest to enable navigation out of the region. In another implementation, at least one radio frequency signal or microwave signal can be received from a set of at least one transmitter within the region of interest and a representation of at least a portion of the region of interest can be generated from the received at least one radio frequency signal.

In view of the foregoing structural and functional features described above, example methods will be better appreciated with reference to FIGS. 2-6. While, for purposes of simplicity of explanation, the method of FIGS. 2, 3, 5, and 6 are shown and described as executing serially, it is to be understood and appreciated that the present invention is not limited by the illustrated order, as some actions could, in other examples, occur in different orders from that shown and described herein or could occur concurrently. It will be appreciated that some or all of each of these methods can be implemented as machine-readable instructions on a non-transitory computer readable medium.

Figure 2:
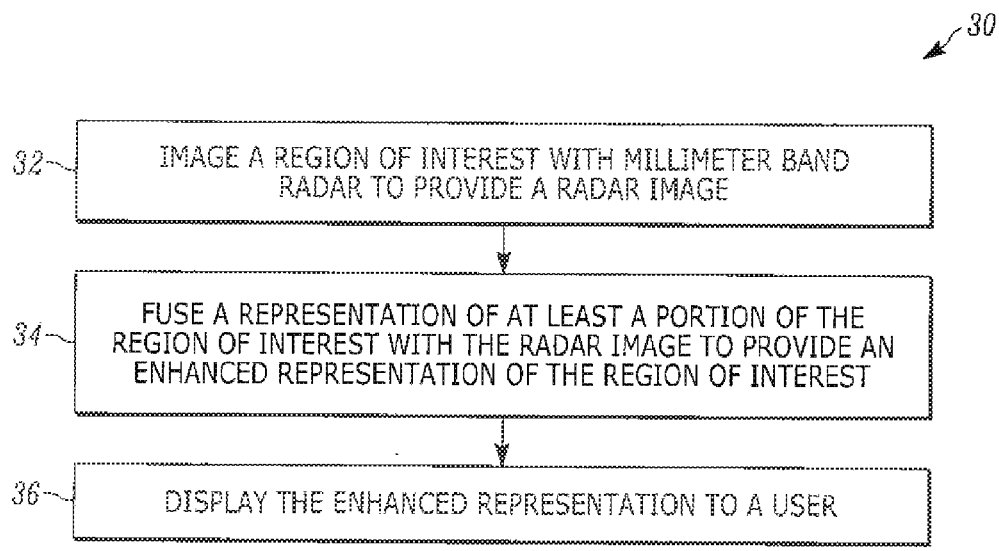
FIG. 2 illustrates a method for providing a representation of a region of interest in an obscured environment.

FIG. 2 illustrates a method 30 for providing a representation of a region of interest in an obscured environment. At 32, the region of interest is imaged with a millimeter band radar system to provide a radar image. At 34, the radar image and a representation of at least a portion of the region of interest is provide an enhanced representation of the region of interest. The representation of at least a portion of the region of interest can include any of a second radar image taken with a different mode of the millimeter band radar system, a second radar image taken with a different millimeter band radar system, a thermal image, navigation data from a navigation system such as the global positioning system, a stored or streamed floor plan including the region of interest, or any other data that may be useful to a user in combination with the radar image. At 36, the enhanced representation of the region of interest is displayed to a user. In one implementation, the display can be mounted on or integral with a face guard or helmet to provide the user with hands-free review of the enhanced representation.

Figure 3:
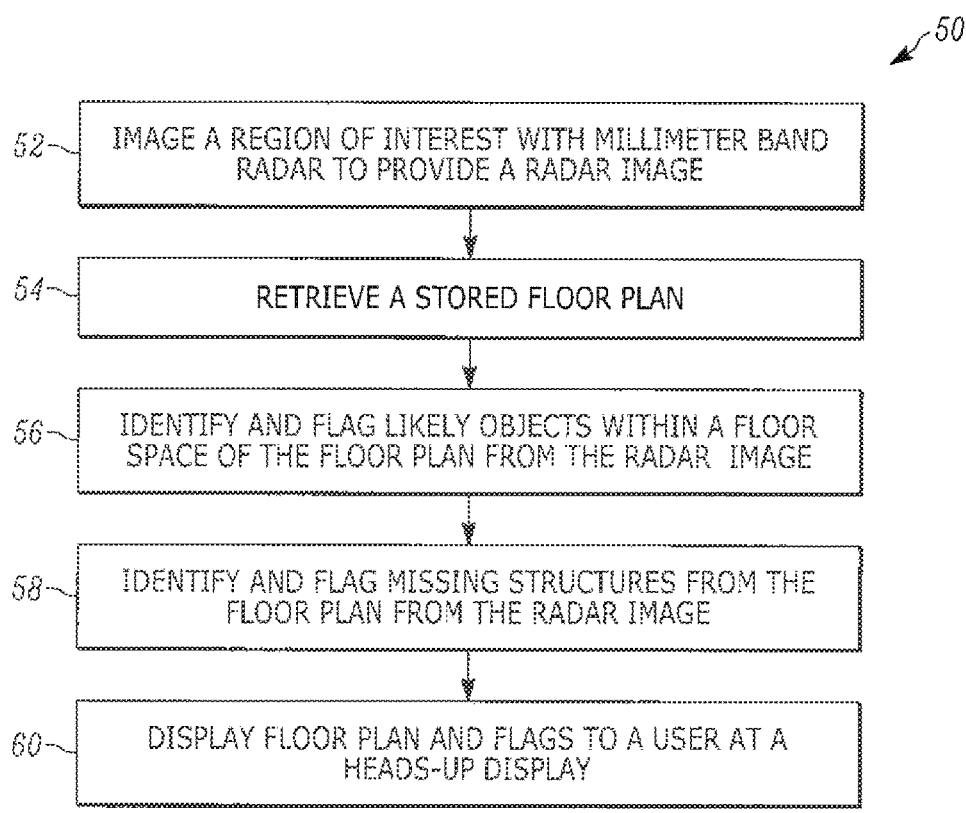
FIG. 3 illustrates a method for providing an enhanced representation of a region of interest from radar imaging and a stored or streamed floor plan including the region of interest.

FIG. 3 illustrates a method 50 for providing an enhanced representation of a region of interest from radar imaging and a stored or streamed floor plan including the region of interest. At 52, the region of interest is imaged with a millimeter band radar to provide a radar image. At 54, a floor plan that includes the region of interest can be retrieved from local or remote storage. At 56, the radar image can be compared to the floor plan to determine where a floor space would be expected in the immediate vicinity of the user, and objects in the user's immediate vicinity can be flagged. In one implementation, the user is tracked via a navigation system, such as a global positioning system, to determine the user's location on the floor plan. In another implementation, the radar image, specifically the pattern of walls and doorways or other openings indicated by the radar image can be matched with the floor plan to determine a room occupied by the user.

At 58, the radar image can be compared to the floor plan to determine where walls and other structures would be expected in the immediate vicinity of the user, and any missing structures can be flagged. At 60, the floor plan and the indicated flags can be displayed to the user, along with, optionally, the radar imaging data. It will be appreciated that the flagged object can represent both navigational hazards as well as personnel in need of assistance, both of which are of clear interest to the user. The missing structures can indicate regions that have suffered significant damage, and can indicate unstable regions that might present a danger to the user. Alternatively, where traditional routes of exit are not available, the missing structures may represent an alternative means of escape that would not be apparent from an unaugmented floor plan. Accordingly, the combination of the two modalities provides a significant advantage over either modality in isolation.

Figure 4:
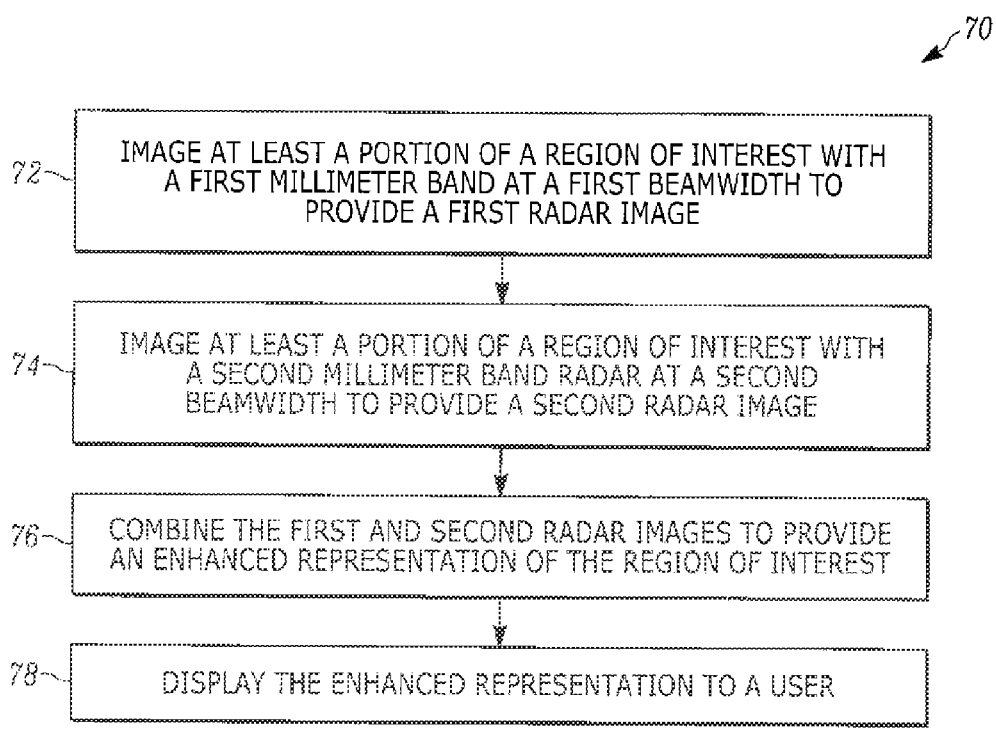
FIG. 4 illustrates a method for imaging a region of interest using two millimeter wave radar assemblies or a single radar assembly operating in multiple modes.

FIG. 4 illustrates a method 70 for imaging a region of interest using two millimeter wave radar assemblies or a single radar assembly operating in multiple modes. At 72, at least a portion of the region of interest is imaged with a millimeter band radar having a first beamwidth to provide a first radar image. At 74, at least a portion of the region of interest is imaged with a millimeter band radar having a second beamwidth, to provide a second radar image. It will be appreciated that the portions of the region of interest imaged by the first and second millimeter band radars will be at least partially overlapping. It will be appreciated that the first and second radar images can be generated at 72 and 74 by first and second millimeter band radars or a single radar assembly operating in two different modes.

At 76, the first and second radar images are combined to provide an enhanced representation of the region of interest, and this enhanced representation of the region of interest is displayed to a user at 78. In the illustrated implementation, the two radar images represent two coverage zones, a "long range" coverage zone and a "medium range" coverage zone. These two coverage zones are illustrated in FIG. 5, which illustrates the zones with a distance from the radar, in meters, on the vertical axis 92 and a cross range, also in meters, on the horizontal axis 94.

Figure 5:
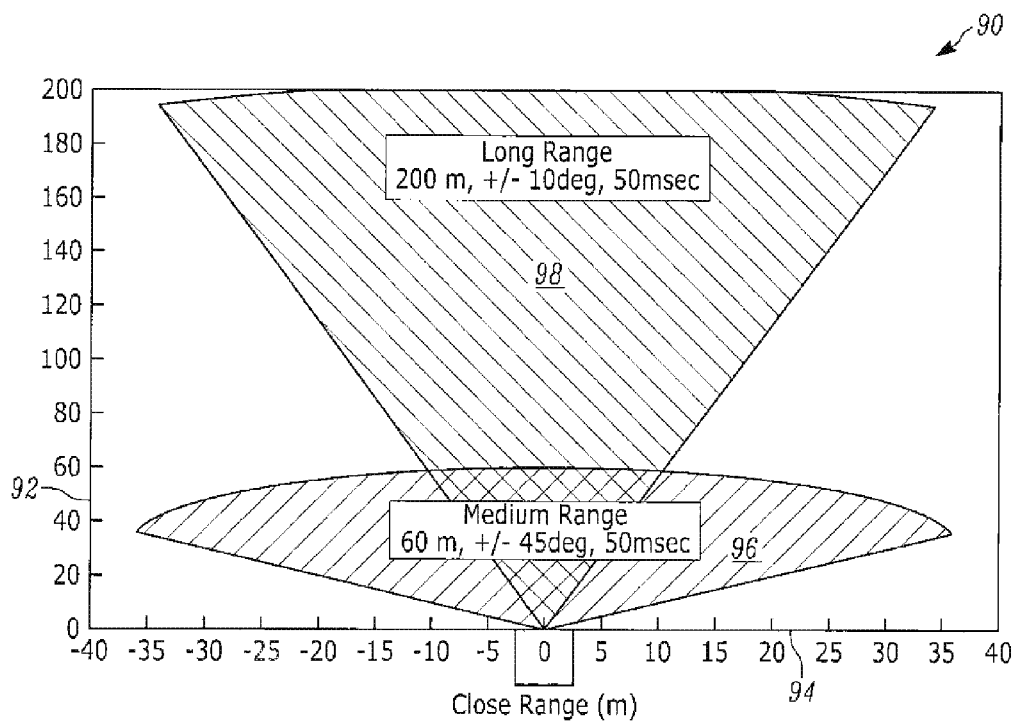
FIG. 5 illustrates one example of an enhanced representation provided by a implementation of the method of FIG. 4.

As can be seen in FIG. 5, the medium range 96 covers +/−45 degrees horizontal (azimuth) FOV with a twelve degree bandwidth and a maximum range of sixty meters. It will be appreciated that the high beamwidth medium range imaging 96 is useful for allowing a user to navigate obstacles in the immediate vicinity of the user and locate pathways that are relatively free from obstruction within the imaged region. The long range zone 98 covers +/−18 degrees horizontal (azimuth) FOV with a 3.5 maximum range of two hundred meters. The long range zone 98 is useful for allowing the user to determine the viability of routes, such as hallways or tunnels, before spending time navigating these routes. In particular, the radar can penetrate doors and other relatively thin obstructions, allowing the user to determine, via the long range coverage 98, if a particular doorway is likely to lead to an appropriate passage, and thus, if it is worth the risk of opening a given door. In the illustrated implementation, the elevation coverage is +/−5 degrees for both long and medium range zones. Both the long and medium range zones are covered every fifty milliseconds.

Figure 6:
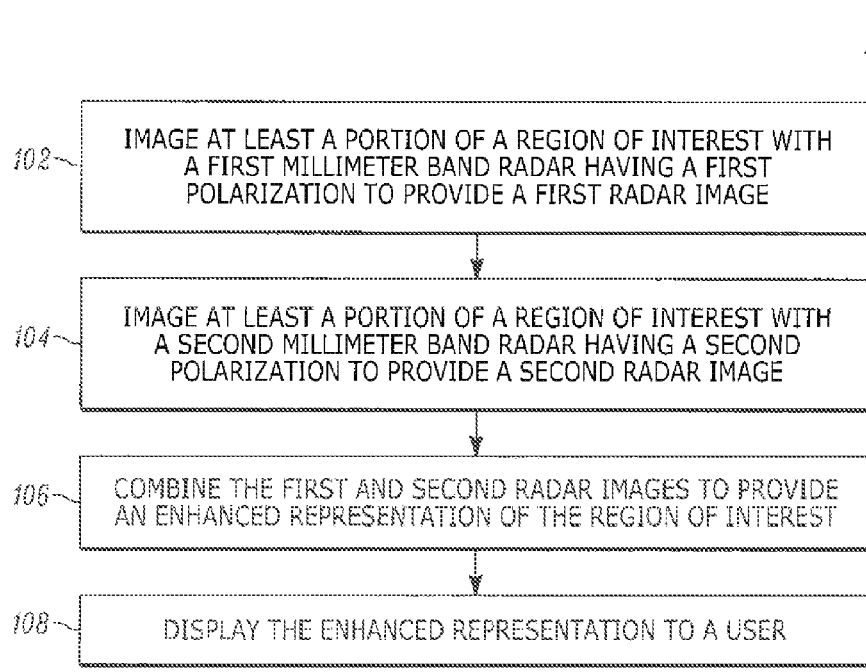
FIG. 6 illustrates a method for imaging a region of interest using two millimeter wave radar assemblies.

FIG. 6 illustrates a method 100 for imaging a region of interest using two millimeter wave radar assemblies. At 102, at least a portion of the region of interest is imaged with a first millimeter band radar, having a first polarization, to provide a first radar image. At 104, at least a portion of the region of interest is imaged with a second millimeter band radar, having a second polarization, to provide a second radar image. It will be appreciated that the portions of the region of interest imaged by the first and second millimeter band radars will be at least partially overlapping and, in the illustrated implementation, the imaged portions substantially coincide.

At 106, the first and second radar images are combined to provide an enhanced representation of the region of interest. In the illustrated implementation, the first and second polarizations are horizontal and vertical polarizations, and a population dependent relationship between the two independent data sets gathered on each of a plurality of subregions in the region of interest and the corresponding data sets on the average of all subregions (or historic values of such subregions) yields an assessment of the presence or absence of a prepositioned target. For example, such targets could be worn by emergency personnel to facilitate locating the personnel or embedded in walls or door frames along an evacuation route. The enhanced representation is then displayed to the user at 108. It will be appreciated that while the example given herein utilizes orthogonal polarizations, the illustrated method 100 is not limited to the use of orthogonal polarizations.

In one example, the targets can be cylindrical objects, and the radar data is combined by looking at the population independent relationship between the two independent polarization specific data sets (horizontal polarization on transmit and receive (HH), and vertical polarization on transmit and receive (VV)) gathered on each subregion. For example, the W value of a region containing a vertically oriented cylinder would be higher than the W value for regions lacking a vertically oriented cylinder. Since it is not possible, a priori, to know the orientation of personnel wearing such a target in an emergency situation, the absolute values of the ratios |VV/HH| plus |HH/VV| are exampled to provide an indicator that takes the form of a band, below which there is a high probability that a target is not a present in that region, and above which there is a high probability that a target is a present.

Depending on the specific application, personnel and/or objects not having a target present could be measured to determine what the sum of the ratios would be for a given set of conditions at that time for "normal" (non-threat) targets to establish a baseline sum. If there is no target present, or the orientation of the target is random, that is, neither more vertical nor more horizontal, the ratio summation of |VV/HH| plus |HH/VV| will approximate the baseline. If there is a target present that has a dominant orientation of vertical or horizontal, the ratio summation of |VV/HH| plus |HH/VV| will be greater than the baseline amount. It would be expected that the orientation of the target in objects could be substantially maintained, while careful placement on the gear of personnel could maximize the chance that the target would remain in one of the two dominant orientations. It is also possible that a target with some amount of horizontally disposed components could result in a ratio sum between two and the established "normal" baseline, which also might be indicative of the present of a target. Accordingly, the ability of a user to locate personnel and objects of interest could be greatly enhanced.

Figure 7:
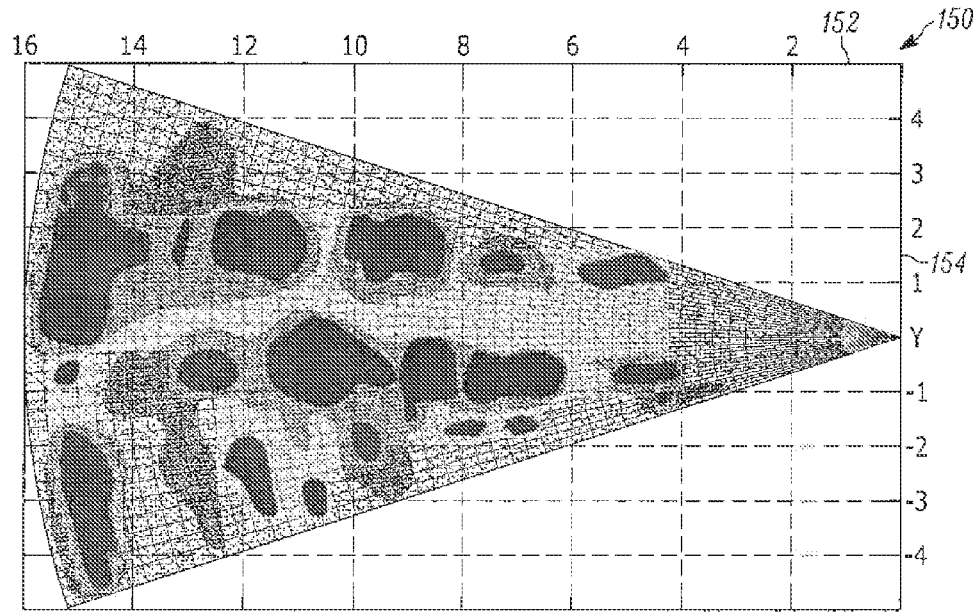
FIG. 7 illustrates an example radar image of a hallway.

FIG. 7 illustrates one example of a radar image 150 of a hallway, taken at five hundred megahertz, with a 3.5 degree beamwidth and a field of view of plus or minus eighteen degrees. The image 150 represents a cross-section of the hallway taken parallel to the floor, with a horizontal axis 152 representing a distance in meters from the user in the direction of a center axis of the radar beam, and the vertical axis 154 representing a distance from the user along an axis within the plane of the cross-section and perpendicular to the direction of the center axis of the radar beam. The walls of the hallway are visible in the two relatively light regions extending parallel to the horizontal axis 152, and exits from the hallway can be seen in the narrow, relatively dark gaps within these regions. Particularly when supplemented with other data, such as other radar images, infrared imaging, or floor plans, the inventor has found that these radar images are sufficient to assist a user in navigating the hallway in obscured conditions.

Figure 8:
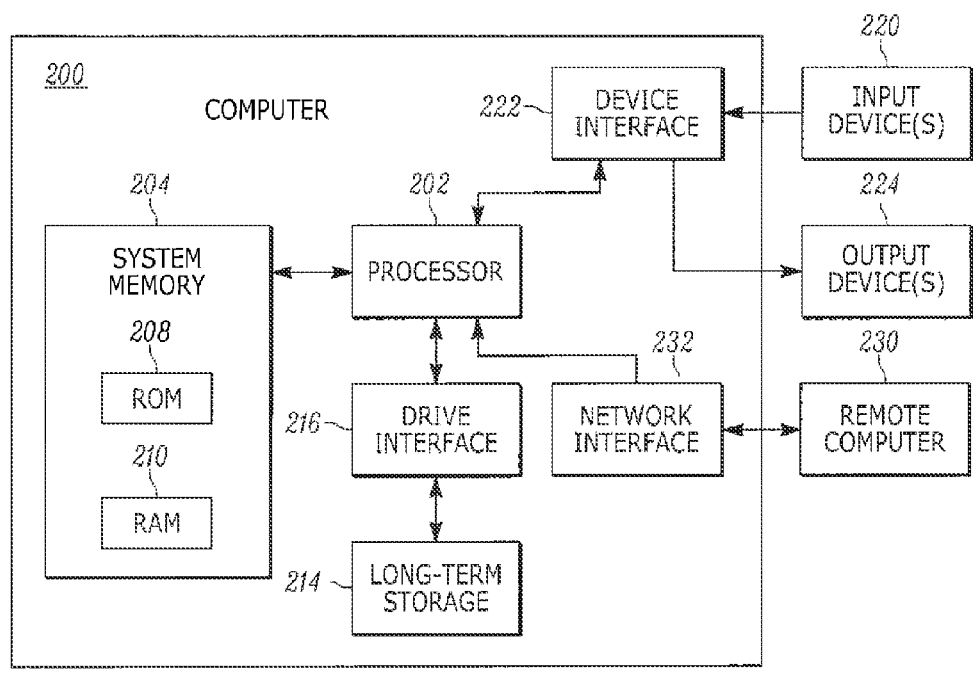
FIG. 8 is a schematic block diagram illustrating an exemplary system of hardware components.

FIG. 8 is a schematic block diagram illustrating an exemplary system 200 of hardware components capable of implementing examples of the systems and methods disclosed herein, such as the imaging system described previously. The system 200 can include various systems and subsystems. The system 200 can be a personal computer, a laptop computer, a workstation, a computer system, an appliance, an application-specific integrated circuit (ASIC), a server, a server blade center, a server farm, etc.

The system 200 can includes a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard, touch screen, and/or a mouse). The system bus 202 can be in communication with the processing unit 204 and the system memory 206. The additional memory devices 208 and 210, such as a hard disk drive, server, stand alone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in formats comprehensible to human beings.

Additionally or alternatively, the system 200 can access an external data source or query source through the communication interface 212, which can communicate with the system bus 202 and the communication link 214.

In operation, the system 200 can be used to implement one or more parts of an imaging system in accordance with the present invention. Computer executable logic for implementing the imaging system resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution. This medium may be distributed across multiple discrete assemblies all operatively connected to a common processor or set of related processors.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A system for navigating an obscured environment, comprising:
   a millimeter band radar assembly operating at a frequency between sixty-five gigahertz and ninety-four gigahertz and configured to capture a radar image of a region of interest within the obscured environment;
   a data source providing a representation of at least a portion of the region of interest, the data source comprising a thermal imager; and
   a data fusion module configured to combine the radar image and the representation of the region of interest to provide an enhanced representation of the region of interest, the enhanced representation including at least locations of walls and obstructions within the region of interest.

2. The system of claim 1, wherein the data source comprises a non-transitory computer readable medium storing data representing the region of interest.

3. The system of claim 2, where the representation of the region of interest is a floor plan of a building containing the region of interest.

4. The system of claim 1, wherein the millimeter band radar is a first millimeter band radar having a first polarization, the data source comprising a second millimeter band radar having a second polarization different than the first polarization.

5. The system of claim 1, wherein the millimeter band radar is a first millimeter band radar having a first beamwidth, the data source comprising a second millimeter band radar having a second beamwidth different than the first beamwidth.

6. The system of claim 1, wherein the data source comprises an infrared camera.

7. The system of claim 1, wherein the data source comprises at least one transmitter within the region of interest.

8. The system of claim 1, wherein the data source comprises at least one reflector within the region of interest, each of the at least one reflector being configured to reflect radiation of the millimeter band radar assembly.

9. A method for providing a representation of a region of interest in an obscured environment comprising:
   loading a floor plan of a building containing the region of interest onto a non-transitory computer readable medium prior to imaging the region of interest to provide a representation of at least a portion of the region of interest;
   imaging the region of interest with the millimeter band radar system operating at a frequency between sixty-five gigahertz and ninety-four gigahertz to provide a radar image;
   fusing the radar image and the representation of at least a portion of the region of interest to provide an enhanced representation of the region of interest, wherein fusing the radar image and the representation includes comparing the radar image to the floor plan and flagging any differences between the radar image and the floor plan; and
   displaying the enhanced representation of the region of interest, including the floor plan and any flagged differences between the radar image and the floor plan, to a user.

10. The method of claim 9, wherein the radar image is a first millimeter band radar image captured at a first polarization, and the representation of at least a portion of the region of interest comprising a second millimeter band radar image captured with a second polarization different than the first polarization.

11. The method of claim 9, wherein the radar image is a first millimeter band radar image captured with a first beamwidth, and the representation of at least a portion of the region of interest comprising a second millimeter band radar image captured with a second beamwidth different than the first beamwidth.

12. The method of claim 9, wherein the representation of at least a portion of the region of interest comprises an infrared image captured by an infrared camera.

13. The method of claim 9, further comprising:
   receiving at least one microwave or radio frequency signal from a set of at least one transmitter within the region of interest; and
   generating a representation of at least a portion of the region of interest from the at least one radio frequency or microwave signal.

14. The method of claim 9, further comprising placing at least one reflector within the region of interest, each of the at least one reflector being configured to reflect radiation of the millimeter band radar assembly.

15. A system for navigating an obscured environment, comprising:
- a millimeter band radar assembly operating at a frequency between sixty-five gigahertz and ninety-four gigahertz and configured to capture a radar image of a region of interest within the obscured environment;
- a data source providing a representation of at least a portion of the region of interest;
- a data fusion module configured to combine the radar image and the representation of the region of interest to provide an enhanced representation of the region of interest, the enhanced representation including at least locations of walls and obstructions within the region of interest; and
- a display configured to display the enhanced image of the region of interest to a user;
- wherein each of the millimeter band radar assembly, the data source, the data fusion module, and the display are wearable by the user, such that the user can utilize the enhanced representation to navigate the obscured environment.

16. The system of claim 15, wherein the data source comprises a non-transitory computer readable medium storing a floor plan of a building containing the region of interest.

17. The system of claim 15, wherein the millimeter band radar is a first millimeter band radar having a first polarization, and the data source is a second millimeter band radar having a second polarization different than the first polarization.

18. The system of claim 15, wherein the millimeter band radar is a first millimeter band radar having a first beamwidth and the data source is a second millimeter band radar having a second beamwidth different than the first beamwidth.

19. The system of claim 15, wherein the data source is an infrared camera.

* * * * *